United States Patent [19]
Kawai et al.

[11] Patent Number: 5,386,094
[45] Date of Patent: Jan. 31, 1995

[54] ELECTRICAL DISCHARGE MACHINE WITH AUTOMATIC FILTERING

[75] Inventors: Hideki Kawai; Hidehiko Tanaka, both of Aichi, Japan

[73] Assignee: Mitsubishi Denki Kabushiki Kaisha, Tokyo, Japan

[21] Appl. No.: 2,414

[22] Filed: Jan. 8, 1993

[30] Foreign Application Priority Data

Jan. 10, 1992 [JP] Japan ................... 4-002996

[51] Int. Cl.⁶ ............... B23H 1/10; B23H 7/36
[52] U.S. Cl. ............... 219/69.14; 219/69.17
[58] Field of Search ............... 219/69.14, 69.17, 69.13

[56] References Cited

U.S. PATENT DOCUMENTS

| | | | |
|---|---|---|---|
| 4,392,110 | 7/1983 | El-Menshawy et al. | 219/69.14 |
| 4,857,688 | 8/1989 | Aso et al. | 219/69.14 |
| 5,091,620 | 2/1992 | Mohri et al. | 219/69.13 |
| 5,189,276 | 2/1993 | Magara | 219/69.14 |

FOREIGN PATENT DOCUMENTS

| | | |
|---|---|---|
| 0286686 | 10/1988 | European Pat. Off. . |
| 0303240 | 2/1989 | Germany . |
| 55-31527 | 3/1980 | Japan . |
| 59-73234 | 4/1984 | Japan ................ 219/69.14 |
| 61-260934 | 11/1986 | Japan . |
| 62-24918 | 2/1987 | Japan ................ 219/69.14 |
| 63-2621 | 1/1988 | Japan ................ 219/69.14 |
| 63-114814 | 5/1988 | Japan . |

*Primary Examiner*—Geoffrey S. Evans
*Attorney, Agent, or Firm*—Sughrue, Mion, Zinn, Macpeak & Seas

[57] ABSTRACT

An electrical discharge machine having an electrode and workpiece contained within a dielectric-filled machining tank for machining in response to the application of discharge current. One or more auxiliary tanks that contain additional dielectric fluid are connected to the machining tank by a plurality of fluid flow paths that contain various combinations of filters, valves and pumps. The filters may be of different filtering capacity for serving different machining operations, e.g., roughing and finishing. The operation of the valves to provide filtering appropriate to the current machining conditions is based on detected or predetermined machining conditions such as sludge grain diameter, fluid pressure, sludge quantity, electrode and workpiece material composition and discharge current levels.

14 Claims, 8 Drawing Sheets

ELECTRICAL DISCHARGE MACHINE WITH AUTOMATIC FILTERING

BACKGROUND OF THE INVENTION

1. Field of the Invention

The present invention relates to an electrical discharge machine and more particularly to a dielectric fluid filtering apparatus.

2. Description of the Background Art

FIG. 9 is an arrangement diagram of a conventional electrical discharge machine as shown in Japanese Patent Disclosure Publication No. 260934 of 1986, which comprises a machining tank 4 containing a dielectric fluid 3, a workpiece 1 placed on the bottom of the machining tank 4, an electrical discharge machine proper 21 having an electrode 2 servo-fed above the workpiece 1 by a servo head 5, and a dielectric fluid filtering apparatus 30 installed beside the electrical discharge machine 21. A dielectric fluid tank 31 of the dielectric fluid filtering apparatus 30 is sectioned into two machining fluid tanks: a finishing fluid tank 34 and a roughing fluid tank 37. The roughing fluid tank 37 and the machining tank 4 of the electrical discharge machine 21 are connected by a dirty fluid drawing pipe 39 which includes a dirty roughing fluid draining solenoid valve 38, thereby allowing a dirty roughing fluid 40 to be drawn from tank 4, as required. Also, the roughing fluid tank 37 and the machining tank 4 are connected by a clean roughing fluid supplying pipe 43 which includes a clean roughing fluid supplying pump 41, a roughing filter 46 and a clean roughing fluid supplying solenoid valve 42, thereby allowing a clean roughing fluid to be supplied as necessary.

The finishing fluid tank 34 and the machining tank 4 of the electrical discharge machine 21 are connected by a dirty fluid drawing pipe 49 which includes a dirty finishing fluid draining solenoid valve 48, thereby allowing a dirty finishing fluid 50 to be withdrawn as required. Also, the finishing fluid tank 34 and the machining tank 4 are connected by a clean finishing fluid supplying pipe 53 which includes a clean finishing fluid supplying pump 51, a finishing filter 56 and a clean finishing fluid supplying solenoid valve 52, thereby allowing a clean finishing fluid to be supplied as necessary.

In the aforementioned conventional machine, when extremely rough electrical discharge machining is performed on the workpiece 1, wherein, for example, an average machining current of 120A to 500A is applied, the dielectric fluid in the roughing fluid tank 37 is circulated because a large amount of sludge is produced. In this case, the dirty roughing fluid draining solenoid valve 38 and the clean roughing fluid supplying solenoid valve 42 are opened, and the clean roughing fluid supplying pump 41 is operated. The filter 46 is a paper filter that has low filtering accuracy, i.e. it has coarse meshes of approximately 10 to 20 microns. In comparison, when a finishing operation employing a comparatively little current is performed, the roughing fluid tank 37 is not used but the dielectric fluid in the finishing fluid tank 34 is circulated. In this case, the dirty finishing fluid draining solenoid valve 48 and the clean finishing fluid supplying solenoid valve 52 are opened, and the clean finishing fluid supplying pump 51 is operated. The filter 56 is a paper filter that has high filtering accuracy, i.e. it has fine meshes of approximately 3 to 5 microns.

In this conventional electrical discharge machine, the dielectric fluids for roughing and finishing are supplied and filtered separately. However, since the grain diameter of the sludge produced during machining will vary depending on an electrical discharge machining condition, i.e. an average machining current, the conventional system cannot filter the sludge sufficiently. Thus, especially in finishing, some sludge stays in the machining fluid and appears at the machining gap, thereby destabilizing the machining. Also, since the difference between roughing and finishing operations may be difficult to judge, the automatic selection of the proper filtering path may not be possible. Accordingly, often an operator's sense and experience is necessary to decide which type of operation is being conducted and the filtering path of the dielectric fluid normally is switched manually.

SUMMARY OF THE INVENTION

It is accordingly an object of the present invention to overcome the disadvantages in the conventional system by providing a dielectric fluid filtering apparatus which supplies a machining tank with a clean dielectric fluid appropriate for machining under a variety of conditions.

The first embodiment of invention achieves an electrical discharge machine comprising sludge grain diameter information outputting means, which stores a relationship between an electrical discharge machining condition and the grain diameter of sludge produced by electrical discharge machining and outputs information on said sludge grain diameter corresponding to such electrical discharge machining condition, and filter selecting means which selects a filter according to the sludge grain diameter from among a plurality of filters different in filtering accuracy upon the input of said information, thereby permitting the selection of a proper path for supplying a clean dielectric fluid appropriate for electrical discharge machining.

The second embodiment achieves an electrical discharge machine comprising sludge grain diameter information outputting means which stores a relationship between an electrical discharge current value as an electrical discharge machining condition and the grain diameter of produced sludge on a workpiece material basis and outputs information on such sludge grain diameter corresponding to said electrical discharge machining condition, thereby permitting the selection of a proper filtering path for supplying a clean dielectric fluid appropriate for electrical discharge machining.

The third embodiment of the invention achieves an electrical discharge machine comprising sludge grain diameter detecting means which detects the grain diameter of sludge produced by electrical discharge machining and outputs a sludge grain diameter detection signal to filter selecting means for selecting a filter according to the sludge grain diameter from among a plurality of filters different in filtering accuracy, thereby permitting the supply of a clean dielectric fluid appropriate for electrical discharge machining independently of the material of a workpiece.

It will also be apparent that the fourth embodiment of an electrical discharge machine comprises valve means which is provided for each of a plurality of filters different in filtering accuracy and is opened and closed in accordance with an incoming filter select signal from filter selecting means, thereby allowing the most appropriate filter for a machining condition to be selected automatically from among the plurality of filters.

The fourth embodiment of the electrical discharge machine comprises sludge amount information outputting means, which stores a relationship between an electrical discharge machining condition and the amount of sludge produced by electrical discharge machining and outputs information on such sludge amount corresponding to such electrical discharge machining condition, and filter selecting means which switches among a plurality of filters from one or more to other in accordance with the information input, thereby allowing filter replacement to be made without stopping the electrical discharge machine.

The fifth embodiment achieves an electrical discharge machine comprising filter pressure measuring means, which measures pressure applied to a filter by sludge produced by electrical discharge machining, and filter selecting means which switches among a plurality of filters in accordance with a pressure signal input from the filter pressure measuring means, thereby allowing filter replacement to be performed without stopping the electrical discharge machine.

DESCRIPTION OF THE PREFERRED EMBODIMENTS

Figure 1:
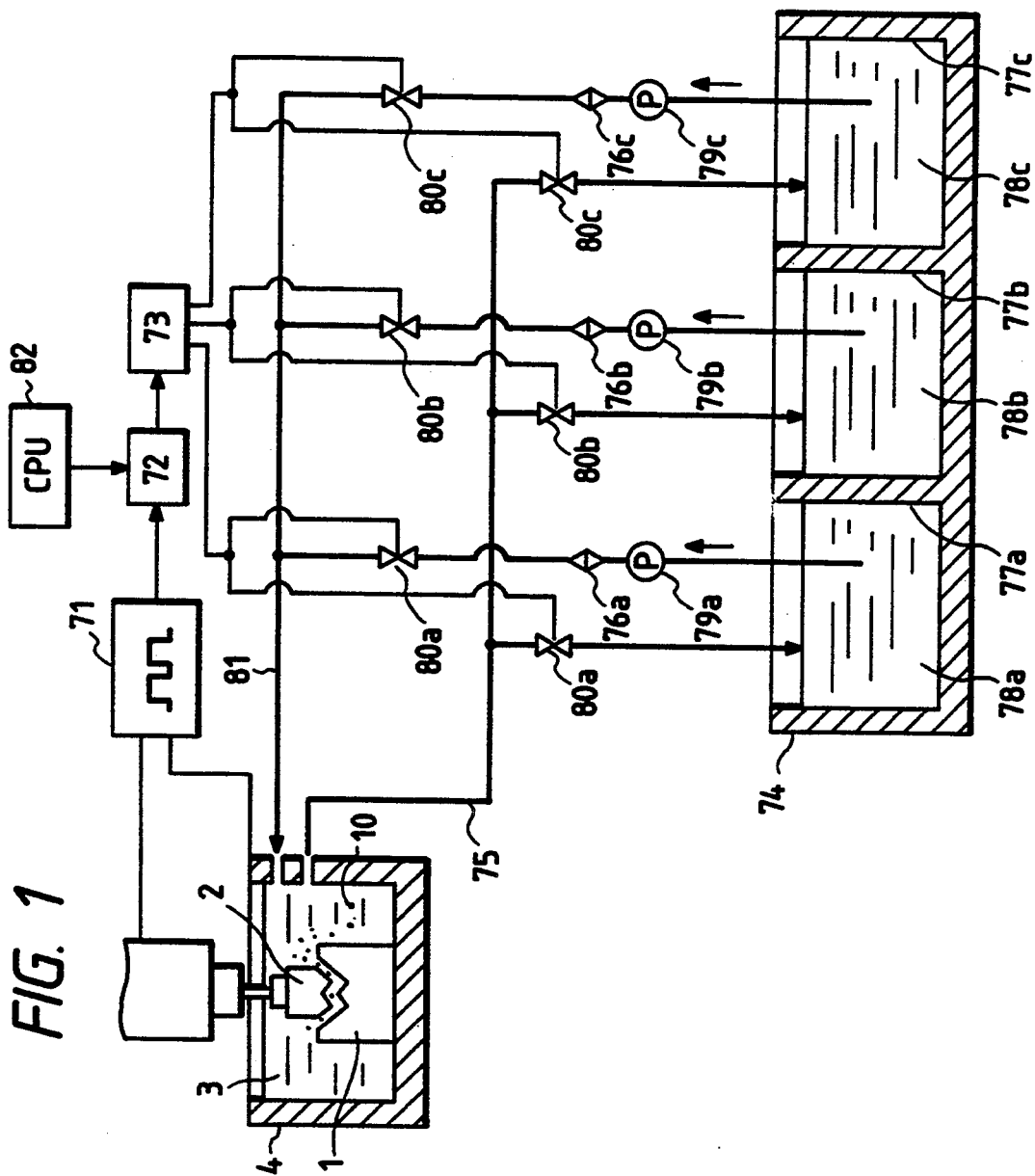
FIG. 1 is an overall arrangement drawing illustrating an electrical discharge machine as a first embodiment of the present invention.

Embodiments of invention will now be described with reference to FIGS. 1 and 2, wherein reference characters identical to those in the conventional apparatus indicate identical or corresponding parts.

Figure 2:
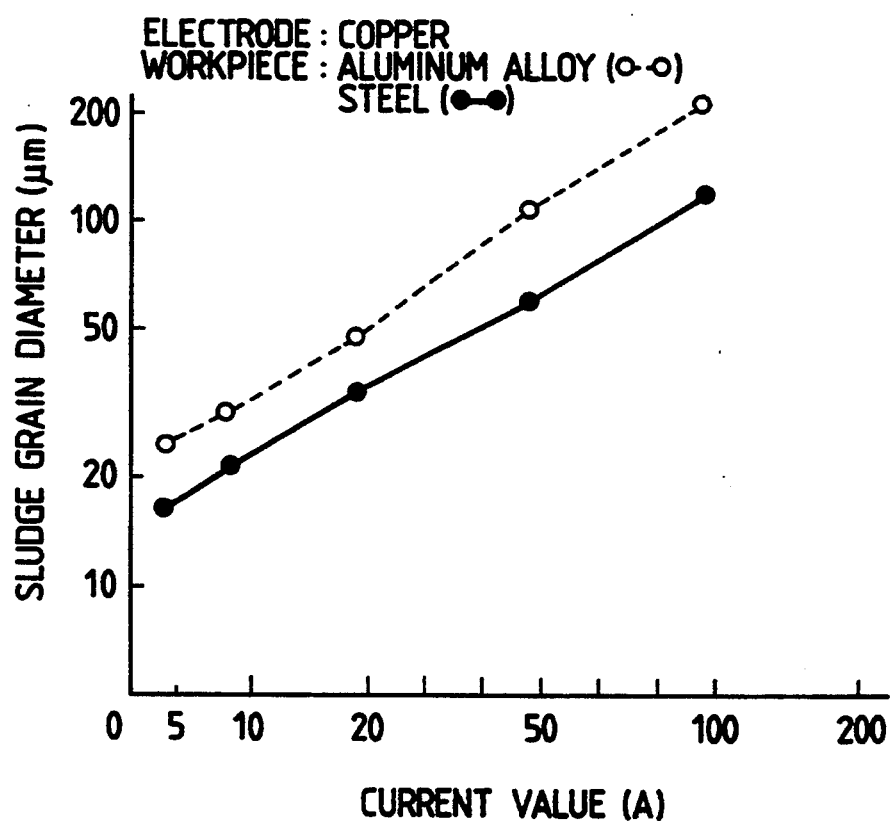
FIG. 2 illustrates a relationship between an average machining current and a sludge grain diameter.

FIG. 1 is an overall arrangement diagram of an electrical discharge machine illustrating an embodiment of the present invention. Referring to FIG. 1, the numeral 1 indicates a workpiece, 2 an electrode for electrical discharge machining, 3 a dielectric fluid, and 4 a machining tank for storing the dielectric fluid 3. Normally, various machining operations employing this type of electrical discharge machine are performed with the workpiece 1 immersed in the machining tank 4. In addition, 10 indicates sludge produced by electrical discharge machining, 71 a pulse current generator for supplying an electrical discharge pulse current between the electrode 2 and the workpiece 1, and 72 a storage device acting as sludge grain diameter information outputting unit which stores a relationship between an electrical discharge machining condition, i.e. an average machining current, set to the pulse current generator 71 and the grain diameter of the sludge 10 produced when machining is carried out with the average machining current. Storage 72 outputs information on the sludge grain diameter corresponding to the electrical discharge machining condition upon the input of the condition. 73 indicates a switching device serving as filter selecting unit for switching the filtering path of the dielectric fluid 3 upon receipt of a command from the storage device 72. 74 is a dielectric fluid tank, and 75 is a dirty dielectric fluid drawing pipe which runs between the inside of the machining tank 4 and the dielectric fluid tank 74.

To the storage device 72, machining conditions, i.e., set values attributable to information based on the materials of the electrode 2 and the workpiece 1 or information based on dielectric fluid pressure, are entered beforehand from a CPU or manual input components 82.

76a, 76b and 76c indicate dielectric fluid filters provided for the dielectric fluid tank 74. The filters are different in filtering accuracy, the accuracy becoming higher in order of filters 76a, 76b and 76c. In addition, 77a, 77b and 77c are partition plates for sectioning the dielectric fluid tank 74 into independent compartments. Further, 78a, 78b and 78c are dirty fluids stored in the independent compartments. 79a, 79b and 79c are supply pumps for supplying the dirty fluids 78a, 78b and 78c stored in the independent compartments. 80a, 80b and 80c are dielectric fluid path switching solenoid valves for switching the filtering paths of the dirty fluids 78a, 78b and 78c. Finally, 81 is a clean dielectric fluid supply pipe running between the machining tank 4 inside and the dielectric fluid tank 74.

The data base of the storage device for storing the grain diameter of the sludge 10 will now be described. FIG. 2 illustrates a relationship between the electrical discharge machining condition (average machining current) and the sludge grain diameter at a time when the electrode 2 is made of steel and the workpieces 1 are made of copper and aluminum alloy. For instance, when the workpiece 1 is made of steel, the sludge grain diameter is 110 microns when machining is carried out at the average machining current of 100A, 65 microns at 50A, 25 microns at 10A, and 18 microns at 5A. Regarding the electrical discharge machining condition (average machining current) and the sludge grain diameter at a time when, for example, copper is employed for the electrode 2 and aluminum alloy for the workpiece 1, the sludge grain diameter is 180 microns at the average machining current of 100A, 90 microns at 50A, 32 microns at 10A, and 25 microns at 5A. The above data is generally known and the storage device 72 stores grain diameter data per average machining current on a material-by-material basis.

The machining conditions, such as the electrode 2 and workpiece 1 materials, are input from the input device 82 and the electrical discharge machining condition is input from the pulse generator 71, respectively, to the storage device 72.

The operation of the electrical discharge machine arranged as described above will now be described. As described previously, the dielectric fluid filters 76a, 76b and 76c provided for the dielectric fluid tank 74 become higher in filtering accuracy in numerical sequence. The filter 76a is a paper filter of coarse 50-micron meshes and is low in filtering accuracy, the filter 76b is a paper filter of 20-micron meshes, and the filter 76c is a paper filter of fine 5-micron meshes and is high in filtering accuracy.

The switching device 73, acting as the filter selecting unit, switches the filtering path of the dielectric fluid 3 upon receipt of an input from the storage device 72, which stores the grain diameters of the sludge 10 at a time when machining is performed on the electrical discharge machining condition set to the pulse current generator 71. Namely, the switching device 73 controls the dielectric fluid path switching solenoid valves 80a, 80b and 80c for switching the filtering path so that the dirty dielectric fluid flows into the filter 76a if the grain diameter of the sludge 10 is 50 microns or larger, into the filter 76b if the grain diameter is between 20 microns and less than 50 microns, and into the filter 76c if the grain diameter is less than 20 microns. Accordingly, the filtering is performed most efficiently and dielectric fluid is kept optimally clean for supply into the machining tank 4.

Another embodiment of the present invention will now be described with reference to FIG. 3, wherein the dielectric fluid tank 74 in the aforementioned embodiment is substituted by a one-compartment dielectric fluid tank 74. Dielectric fluid path switching solenoid valves 80a, 80b and 80c for switching the filtering path of the dielectric fluid 3 are provided for the clean dielectric fluid supplying pipe 81 running between the machining tank 4 inside and the dielectric fluid tank 74 and are controlled as described in the aforementioned embodiment. The switching apparatus 73 is designed to allow one or more of the solenoid valves 80a, 80b and 80c to be switched, and the two solenoid valves 80a or 80b to be connected in series to provide against the failure of either solenoid valve.

Whereas the control of the dielectric fluid filtering path according to the sludge grain diameter is identical to that in the aforementioned embodiment and provides the same effect, the single-compartment dielectric fluid tank 74 reduces the installation area and manufacturing costs of the dielectric fluid tank 74.

Figure 4:
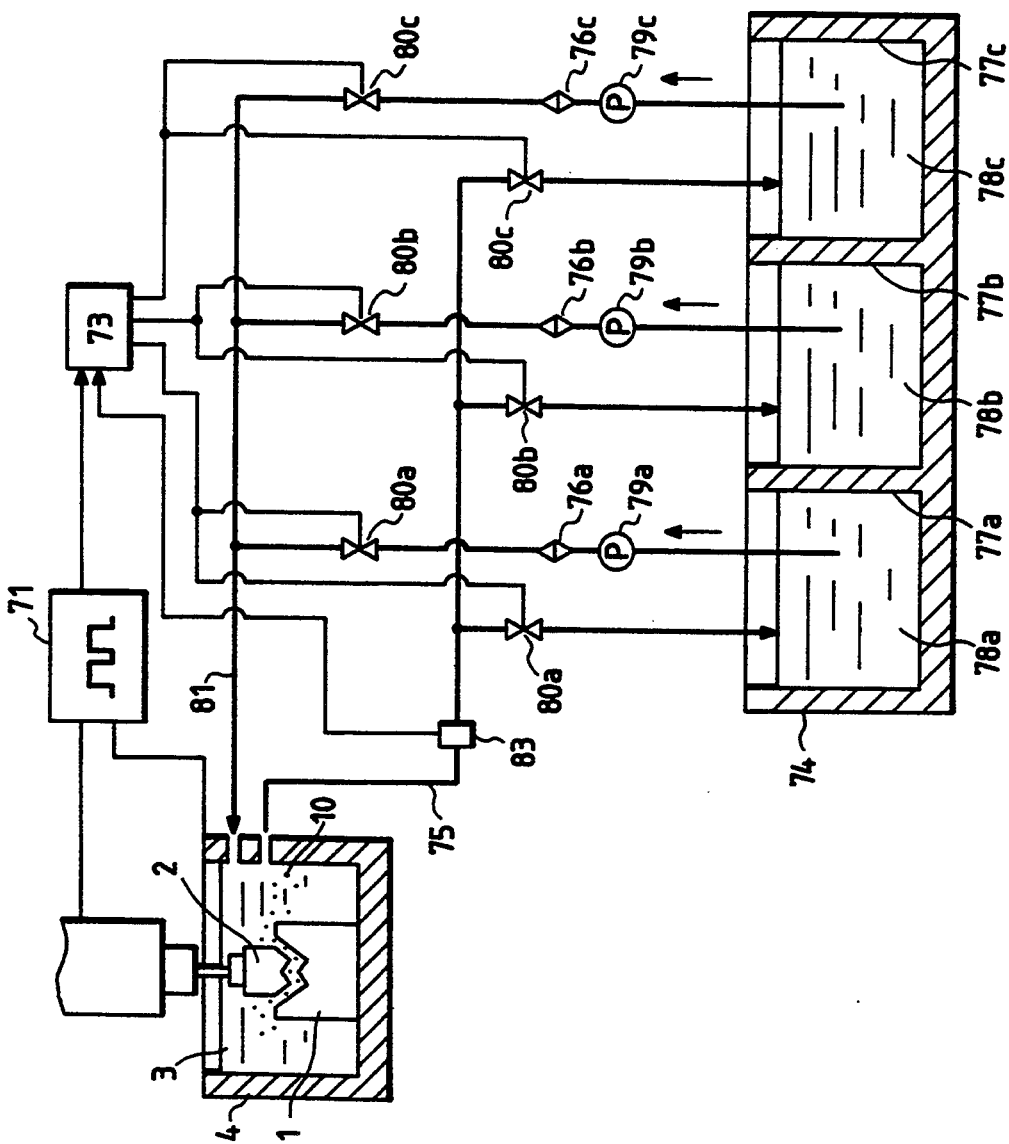
FIG. 4 is an overall arrangement drawing illustrating an electrical discharge machine as a third embodiment of the present invention.

FIG. 4 is an overall arrangement diagram of an electrical discharge machine as third embodiment invention, wherein 1 to 4, 10, 71, and 74 to 81 will not be described here because they indicate parts identical or corresponding to those in the overall arrangement diagram of the electrical discharge machine shown in the previous embodiments.

In FIG. 4, 83 indicates a detection sensor for detecting the grain diameter of the sludge 10 at a time when machining is conducted on the electrical discharge machining condition set to the pulse current generator 71, and 73 is a switching device acting to select a filter by switching the filtering path of the dielectric fluid 3 upon receipt of an input from the detection sensor 83.

The operation of the electrical discharge machine of the present invention arranged as described above will now be described. As mentioned previously, the dielectric fluid filters 76a, 76b and 76c provided for the dielectric fluid tank 74 become higher in filtering accuracy in numerical sequence. The filter 76a is a paper filter of coarse 50-micron meshes low in filtering accuracy, the filter 76b a paper filter of 20-micron meshes, and the filter 76c a paper filter of fine 5-micron meshes high in filtering accuracy.

The switching device 73 serves to select a filter selecting by switching the filtering path of the dielectric fluid 3 upon receipt of an input from the detection sensor 83. The sensor detects the grain diameter of the sludge 10 at a time when machining is carried out under the electrical discharge machining conditions set in the pulse current generator 71. The sensor controls the dielectric fluid path switching solenoid valves 80a, 80b and 80c, which switch the filtering path so that the dirty dielectric fluid flows into the filter 76a if the grain diameter of the sludge 10 is 50 microns or larger, into the filter 76b if the grain diameter is between 20 microns and less than 50 microns, and into the filter 76c if the grain diameter is less than 20 microns. Hence, the dielectric fluid is kept clean and supplied into the machining tank 4 under a variety of machining conditions.

Figure 3:
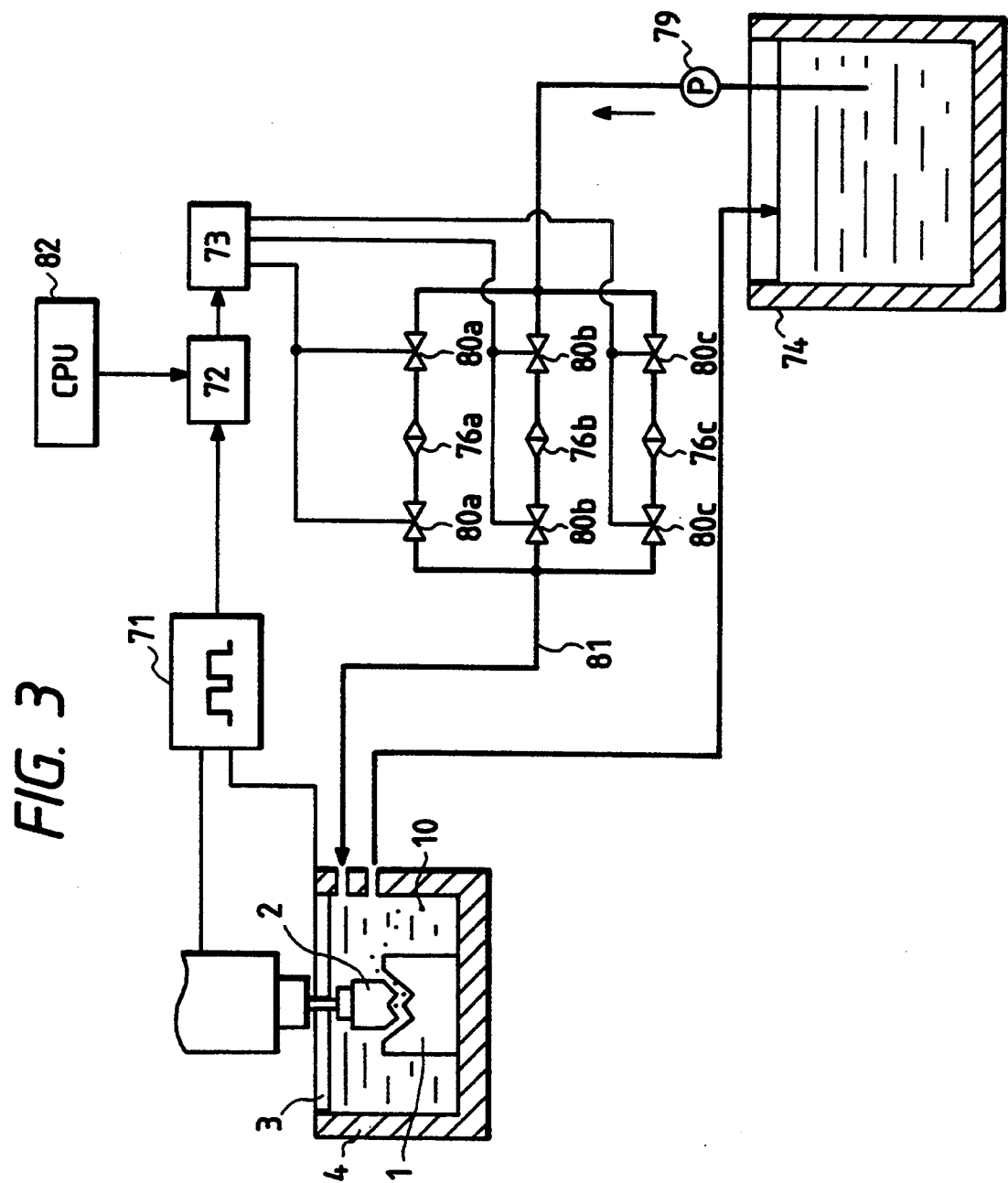
FIG. 3 is an overall arrangement drawing illustrating an electrical discharge machine as a second embodiment of the present invention.

The storage device 72 shown in the embodiments of FIG. 1 or FIG. 3 may be replaced by the sludge grain detection sensor 83 to produce an effect as described for the third embodiment. In addition, control can be carried out with further higher accuracy by using the storage device 72 and the sludge grain diameter detection sensor 83 in combination.

Figure 5:
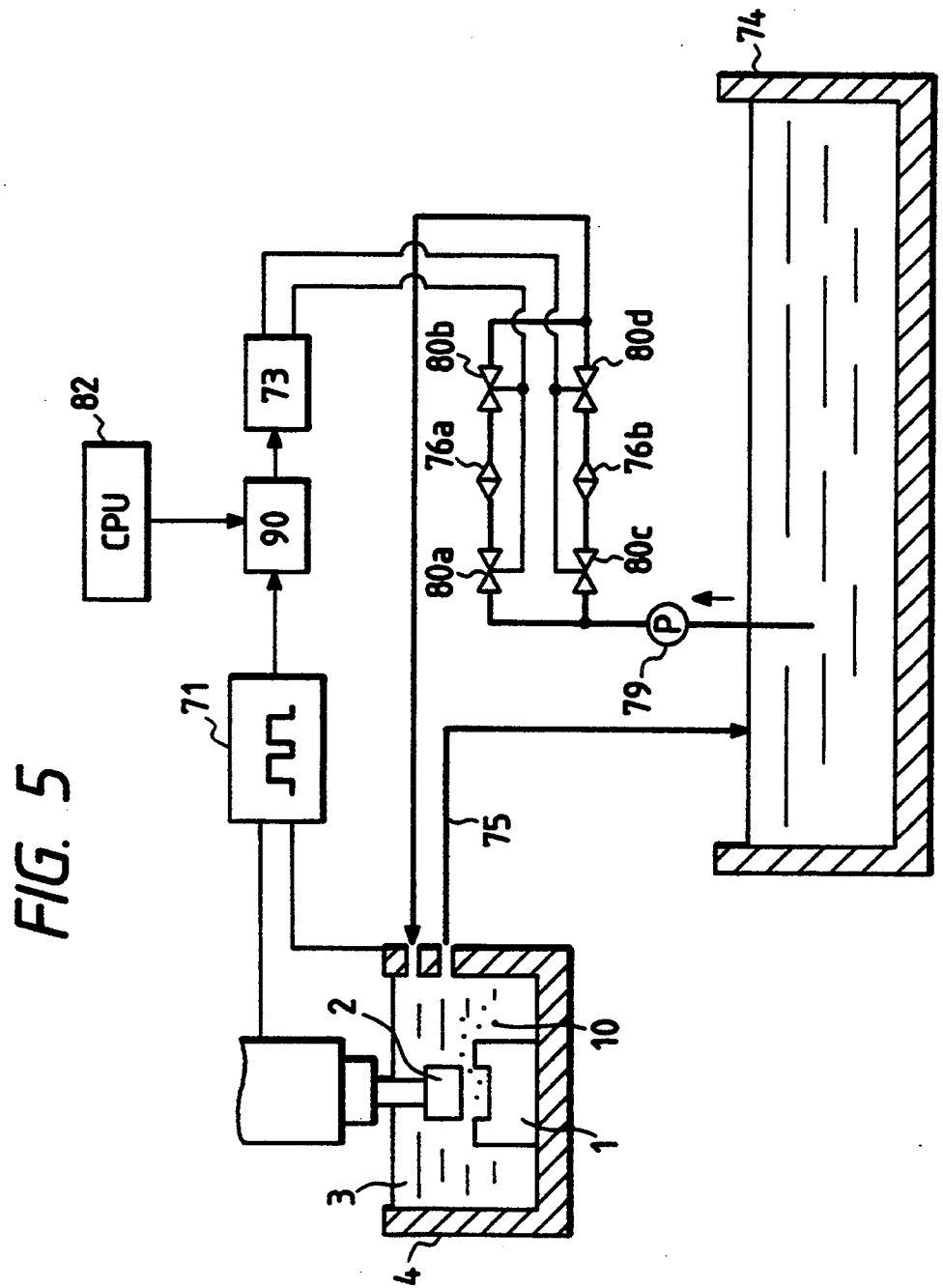
FIG. 5 is an overall arrangement drawing illustrating an electrical discharge machine as a fourth embodiment of the present invention.

FIG. 5 is an overall arrangement diagram of an electrical discharge machine as a fourth embodiment of the invention, wherein parts identical or corresponding to those in the aforementioned embodiment are designated by identical reference characters and will not be described here.

Referring to FIG. 5, 90 indicates a sludge amount storage device for storing the amount of the sludge 10 at a time when machining is done on the electrical discharge machining condition set to the pulse current generator 71. 73 is a switching device for switching the filtering path of the dielectric fluid 3 upon receipt of an input from the sludge amount storage device 90.

Figure 6:
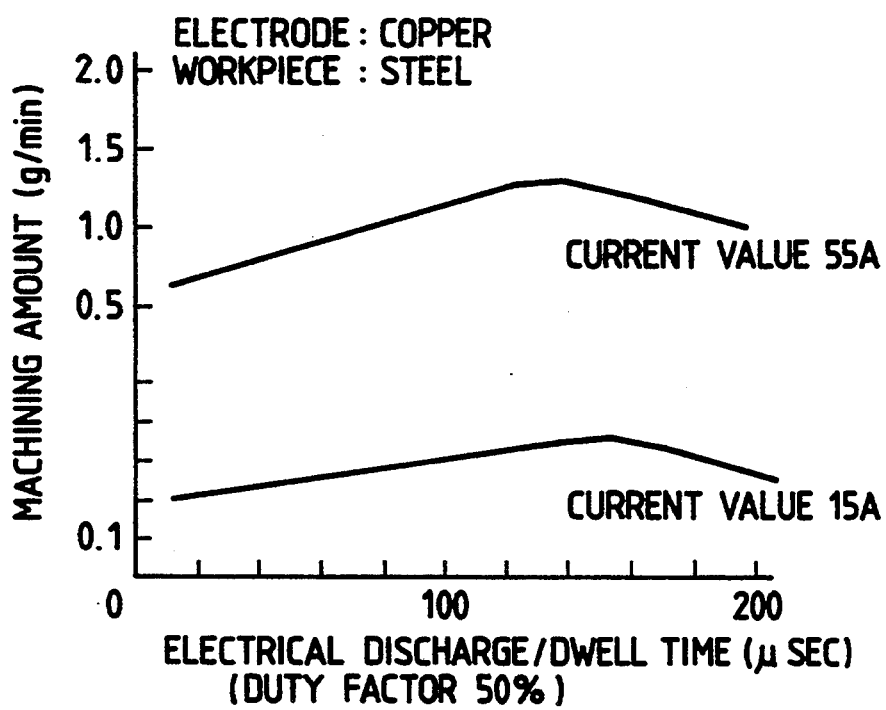
FIG. 6 illustrates a relationship between electrical discharge/dwell time and a machining amount.
Figure 7:
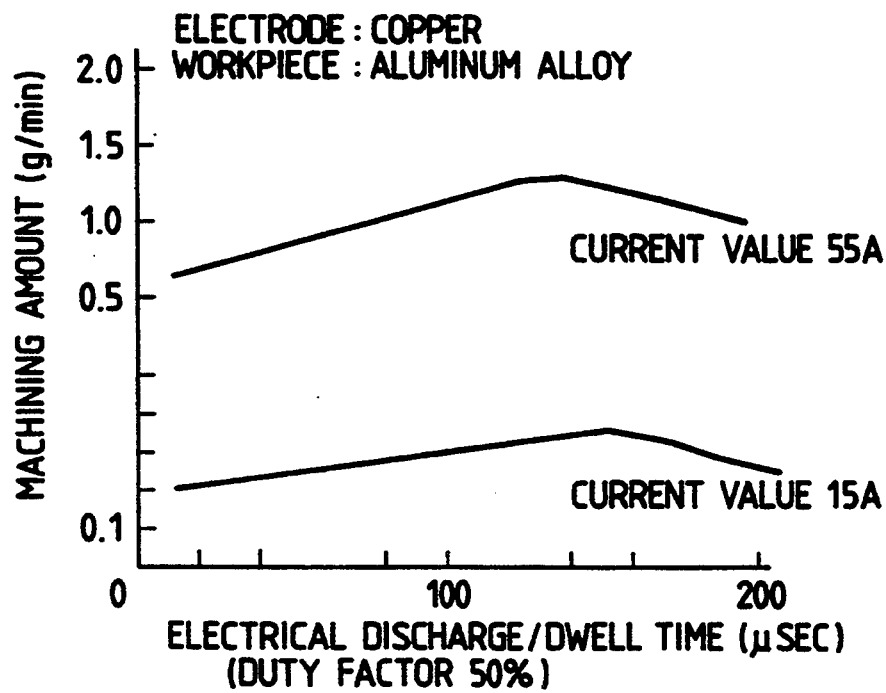
FIG. 7 illustrates a relationship between electrical discharge/dwell time and a machining amount.

The data base of the storage device 90 for storing the grain diameter of the sludge 10 will now be described. FIG. 6 illustrates a relationship between the electrical discharge machining condition and a machining amount at a time when is employed for both the electrode 2 and steel for the workpiece 1. For example, when machining is carried out at the current value of 55A and the electrical discharge/dwell time of 130sec, the machining amount is 1.3 (g/min) as is known. FIG. 7 shows the electrical discharge machining condition versus the machining amount at a time when copper is employed for the electrode 2 and aluminum alloy used for the workpiece 1. As is clear from this drawing, when machining is performed at the current value of 55A and the electrical discharge/dwell time of 130 sec, it is known that the machining amount is 1.6 (g/min). According to such facts, the sludge amount storage device 90 may be provided with machining amount data on an electrical discharge machining condition basis or with parameters on a material-by-material basis, thereby producing an identical effect as in the aforementioned embodiment.

The operation of the electrical discharge machine in the fourth embodiment will now be described. As described previously, a plurality of dielectric fluid filters 76 are provided for the dielectric fluid tank 74, and only one is normally employed. The amount of the sludge 10 produced when machining is performed under the electrical discharge machining condition set by the pulse current generator 71 is stored into the sludge amount storage device 90. When the amount has reached a value at which the capability of the filter 76 is reduced, a command for switching the filtering path is output to the switching device 73, thereby controlling the dielectric fluid filtering path switching solenoid valves 80a, 80b, 80c and 80d. Therefore, the filtering path is switched automatically and filter replacement can be made without stopping the machine.

Figure 8:
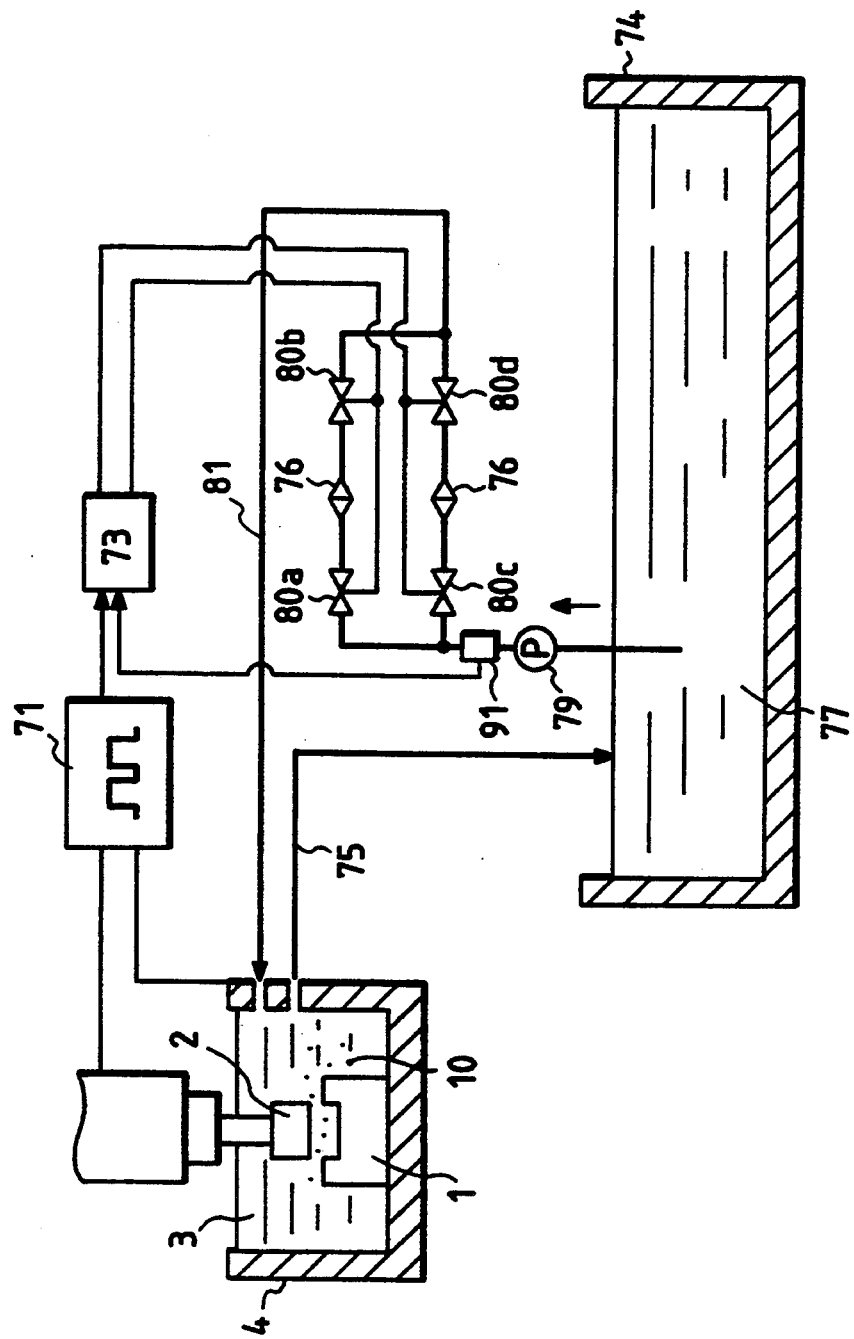
FIG. 8 is an overall arrangement drawing illustrating an electrical discharge machine as a fifth embodiment of the present invention.
Figure 9:
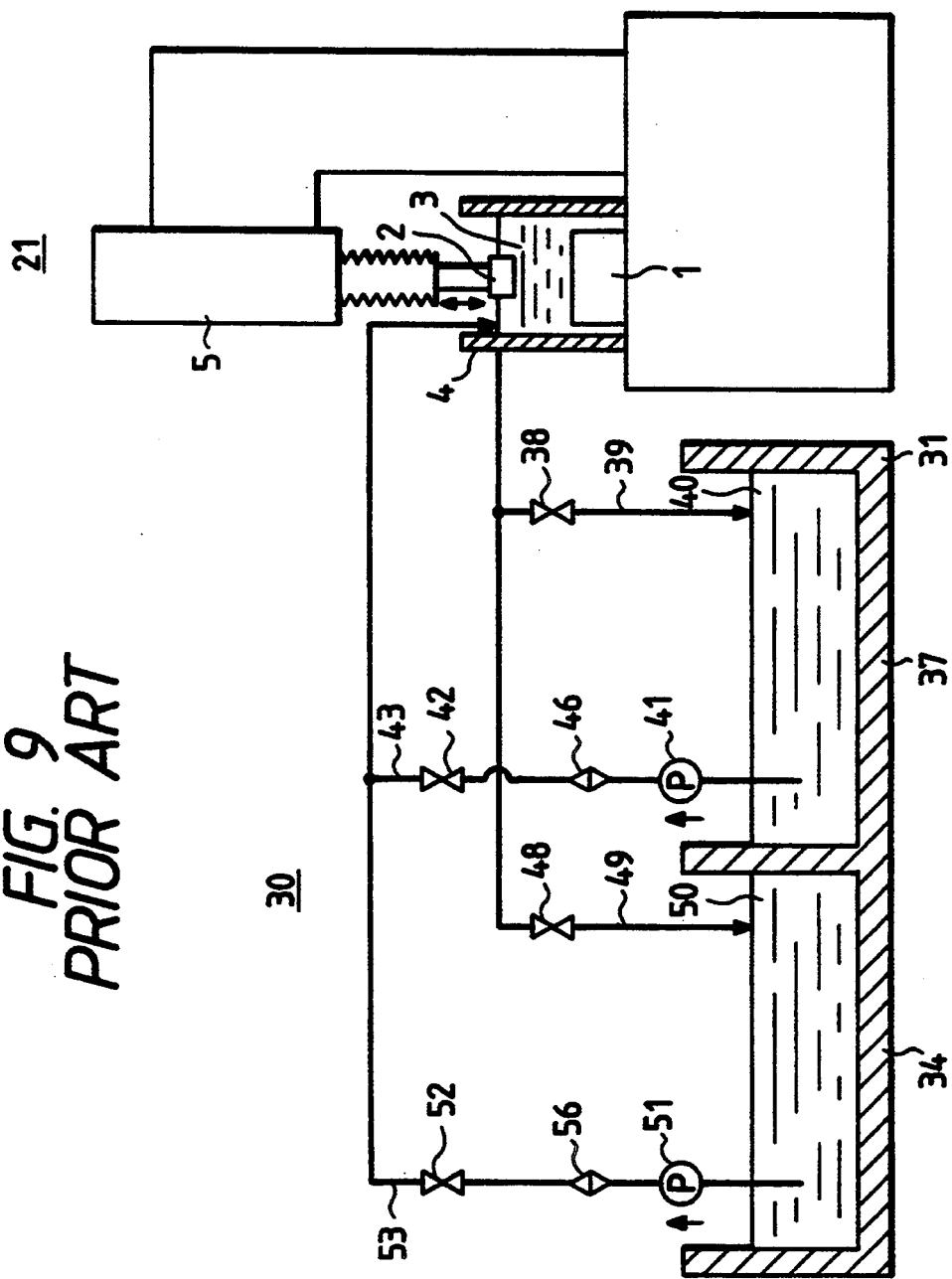
FIG. 9 is an overall arrangement drawing illustrating an electrical discharge machine known in the art.

FIG. 8 is an overall arrangement diagram of an electrical discharge machine as a fifth embodiment of the invention, wherein parts identical or corresponding to those in the aforementioned embodiment are indicated by identical reference characters and will not be described here.

Referring to FIG. 8, 91 indicates a filter pressure measuring unit, and 73 a switching device for switching the filtering path of the dielectric fluid 3 upon receipt of a command from the filter pressure measuring unit 91.

The operation of the electrical discharge machine in the fifth embodiment arranged as described above will now be described. As mentioned previously, there are provided a plurality of dielectric fluid filters 76 for the dielectric fluid tank 74, and only one is normally used. The amount of sludge 10 produced when machining is carried out on the electrical discharge machining condition set by the pulse current generator 71 is measured by the filter pressure measuring unit 91, and when the pressure has reached or exceeded a reference value, a command for switching the filtering path is output to the switching device 73, thereby controlling the dielectric fluid filtering path switching solenoid valves 80a, 80b, 80c and 80d. Hence, the filtering path is switched automatically and filter replacement can be performed without stopping the machine.

In the embodiment shown in FIG. 5, the sludge amount storage device 90 may be replaced by filter pressure measuring device 91 to produce an effect as in the fifth embodiment. In addition, control can be exercised with further higher accuracy by using the sludge amount storage device 90 and the filter pressure measuring device 91 in combination.

As would be understood by one of ordinary skill in the art, the method and apparatus taught herein can be modified within the spirit of the invention to achieve other filtering arrangements, including the selection of one or more filters and the reliance on one or more machining and sludge characteristics.

Although this invention has been described in at least one preferred embodiment with a certain degree of particularity, it is to be understood that the present disclosure of the preferred embodiment has been made only by way of example and that numerous changes in the details and arrangement of components may be made without departing from the spirit and scope of the invention as hereinafter claimed.

What is claimed is:

1. An electrical discharge machine, including a tank containing a dielectric fluid, for machining a workpiece by energizing a current between an electrode and said workpiece opposed with each other in the dielectric fluid, comprising:
    a first plurality of parallel filter paths, each path comprising at least one filter for filtering sludge in the dielectric fluid produced by electrical discharge machining;
    filter pressure detecting means for detecting pressure applied to each of a second plurality of said filters by said sludge produced by electrical discharge machining; and
    filter path selecting means for switching said plurality of parallel filter paths from one to another in accordance with a pressure signal input from said filter pressure detecting means.

2. A method of machining a workpiece under a plurality of machining conditions by energizing a current between an electrode and said workpiece opposed with each other in a dielectric fluid, comprising:
    identifying at least one of said machining conditions; and
    automatically selecting the filtering condition for removing sludge from the dielectric fluid in response to said identifying step.

3. The method of machining a workpiece as set forth in claim 2, wherein said identifying step further comprises detecting an electrical discharge machining condition.

4. The method of machining a workpiece as set forth in claim 3, further comprising:
    storing a relationship between said machining condition and a filtering requirement for sludge produced by electrical discharge machining;
    outputting information on said filtering requirement corresponding to said machining condition in response to said detection step; and
    selectively filtering said sludge in said dielectric fluid produced by electrical discharge machining according to said output filtering requirement.

5. The method of machining a workpiece as set forth in claim 4, wherein said machining condition comprises electrical discharge current values.

6. The method of machining a workpiece as set forth in claim 4, wherein said machining condition comprises the grain diameter of said sludge produced by electrical discharge machining.

7. The method of machining a workpiece as set forth in claim 4, wherein said machining condition comprises the pressure applied to said filters by said sludge within said dielectric fluid.

8. The method of machining a workpiece as set forth in claim 7, wherein said selective filtering step comprises switching fluid flow through selected ones of a plurality of filters in accordance with a detected pressure signal.

9. The method of machining a workpiece as set forth in claim 8, wherein said filters are arranged in parallel fluid flow paths and switching is from one fluid flow path to another.

10. An electrical discharge machine, including a tank containing a dielectric fluid, for machining a workpiece by energizing a current between an electrode and said workpiece opposed with each other in the dielectric fluid, said machining operation resulting in the generation of sludge, comprising:
    a plurality of filters for filtering said sludge in the dielectric fluid;
    sludge information means for identifying at least one characteristic of said sludge; and
    filter selecting means for selectively operating at least one filter according to said at least one sludge characteristic.

11. An electrical discharge machine as defined in claim 10, wherein said sludge characteristic comprises grain diameter.

12. An electrical discharge machine as defined in claim 10, wherein said sludge characteristic comprises sludge quantity.

13. An electrical discharge machine as defined in claim 10, further comprising means for identifying electrical discharge current values and wherein said filter selecting means is responsive to said identifying means.

14. An electrical discharge machine as defined in claim 10, wherein said sludge information means comprises a combination of a sludge characteristic detection means and storage means containing set values attributable to information based on the materials of at least one of the electrode and workpiece.

* * * * *